United States Patent Office 2,867,632
Patented Jan. 6, 1959

2,867,632
6-METHYL STEROID COMPOUNDS

Frank H. Lincoln, Jr., Kalamazoo, and William P. Schneider and George B. Spero, Kalamazoo Township, Kalamazoo County, Mich., assignors to The Upjohn Company, Kalamazoo, Mich., a corporation of Michigan No Drawing. Application November 23, 1956
Serial No. 623,780

5 Claims. (Cl. 260—397.45)

The present invention relates to steroid compounds and is concerned with 6-hydrocarbyl substituted steroid compounds, particularly with 6-methyl-11β,17α-dihydroxy-1,4-pregnadiene-3,20-dione, the 21-iodo substituted intermediate, 6-methyl-17α-hydroxy-1,4-pregnadiene-3,11,20-trione, and a process for the production therefor.

The new compounds and the process of the present invention are illustratively represented by the following formulae:

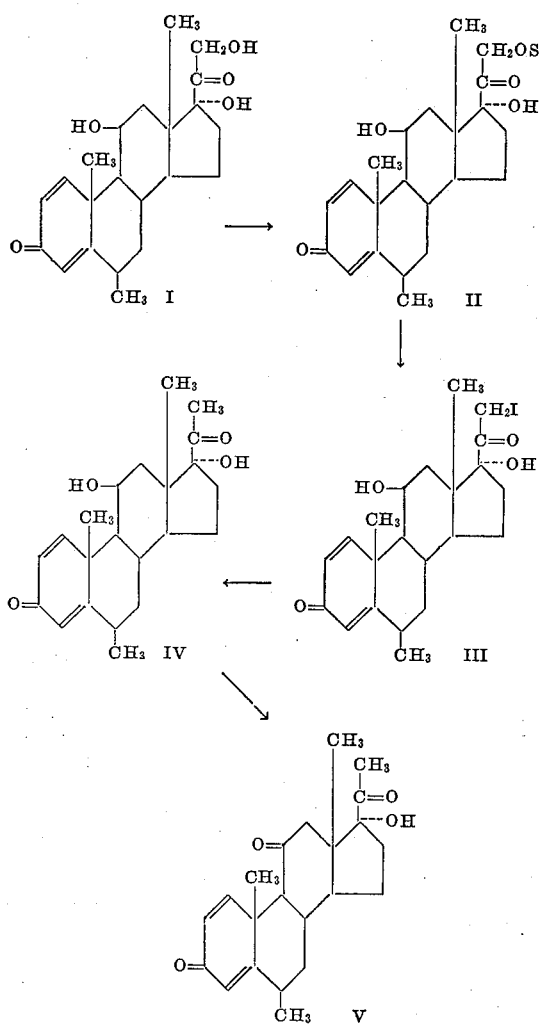

wherein R is an organic radical such as methyl, ethyl, propyl, tolyl, naphthyl, or the like, with methyl preferred.

The process of the present invention comprises treating 6-methyl-11β,17α,21-trihydroxy-1,4-pregnadiene-3,20-dione (1-dehydro-6-methylhydrocortisone (I)) with an organic sulfonyl halide such as methylsulfonyl chloride, toluenesulfonyl chloride, toluenesulfonyl bromide, benzenesulfonyl chloride, α- and β-naphthylsulfonyl chloride, or the like, to obtain the corresponding ester (II), a 21-alkyl- or 21-arylsulfonate of 6-methyl-11β,17α,21-trihydroxy-1,4-pregnadiene-3,20-dione; treating the thus produced 21-alkyl- or arylsulfonate of 6-methyl-11β,17α,21-trihydroxy-1,4-pregnadiene-3,20-dione with sodium iodide in acetone solution to obtain 6-methyl-11β,17α-dihydroxy-21-iodo-1,4-pregnadiene-3,20-dione (III); treating the thus obtained 6-methyl-11β,17α-dihydroxy-21-iodo-1,4-pregnadiene-3,20-dione with a reducing agent such as sodium thiosulfate, sodium bisulfite, potassium bisulfite, or the like, in an aqueous organic solvent mixture to obtain 6-methyl-11β,17α-dihydroxy-1,4-pregnadiene-3,20-dione (IV) and if desired oxidizing the thus obtained 6-methyl-11β,17α-dihydroxy-1,4-pregnadiene-3,20-dione with chromic anhydride, N-bromoacetamide, N-bromosuccinimide, or the like, to give 6-methyl-17α-hydroxy-1,4-pregnadiene-3,11,20-trione (V).

It is an object of the instant invention to provide 6-methyl-11β,17α-dihydroxy-1,4-pregnadiene-3,20-dione and 6-methyl-17α-hydroxy-1,4-pregnadiene-3,11,20-trione and, in particular, the 6α-epimers, 6α-methyl-11β,17α-dihydroxy-1,4-pregnadiene-3,20-dione and 6α-methyl-17α-hydroxy-1,4-pregnadiene-3,11,20-trione. It is another object of the instant invention to provide a process for the preparation of 6-methyl-11β,17α-dihydroxy-1,4-pregnadiene-3,20-dione and 6-methyl-17α-hydroxy-1,4-pregnadiene-3,11,20-trione and the 21-iodo analogues thereof, especially 6-methyl-11β,17α-dihydroxy-21-iodo-1,4-pregnadiene-3,20-dione. Other subjects of this invention will be apparent to those skilled in the art to which this invention pertains.

The novel 6α-methyl-11β,17α-dihydroxy-1,4-pregnadiene-3,20-diones, the 6α-methyl-17α-hydroxy-1,4-pregnadiene-3,11,20-triones possess a high order of physiological activity, and possess activity spectra different from the adrenocortical hormones found in nature such as hydrocortisone and cortisone especially in their effect on mineral and water metabolism. These compounds cause a loss of salt and water which makes them especially valuable in the management of chronic congestive heart failure and in the treatment of cirrhosis of the liver, the nephrotic syndrome and the treatment of eclampsia and preeclampsia. The novel synthetic corticosteroid hormones of the present invention possess also anti-inflammatory, glucocorticoid, anesthetic, uterine, ovarial and adrenal growth-depressional, and adrenocorticoid activity. The anti-inflammatory activity is especially noticeable in all the steroids of the present invention. The 6β-epimers, 6β-methyl-11β,17α-dihydroxy-1,4-pregnadiene-3,20-dione and 6β-methyl-17α-hydroxy-1,4-pregnadiene-3,11,20-trione have the same activity as the 6α-epimers.

The novel 6-methyl-11β,17α-dihydroxy-1,4-pregnadiene-3,20-diones and 6-methyl-17α-hydroxy-1,4-pregnadiene-3,11,20-trione are useful in oral, parenteral and topical compositions. In oral compositions the material may be given as tablets illustratively using either polyethylene glycol 4000 or 6000 as a carrier or lactose and/or sucrose as a diluent. The novel 6α-methyl-11β,17α-dihydroxy-1,4-pregnadiene-3,20-dione and 6α-methyl-17α-hydroxy-1,4-pregnadiene-3,11,20-trione are useful for topical application as ointments, lotions, jellies, creams, suppositories, bougies, aqueous suspensions etc. Examples of advantageous topical compositions are given below. While the examples below are to the 6α-methyl-11β,17α-dihydroxy-1,4-pregnadiene-3,20-dione and 6α-methyl-17α-hydroxy-1,4-pregnadiene-3,11,20-trione, equivalent amounts of 6β-methyl-11β,17α-dihydroxy-1,4-pregnadiene-3,20-dione and 6β-methyl-17α-hydroxy-1,4-pregnadiene-3,11,20-trione and of other 6-lower-alkyl and phenyl homologues of the compounds of this invention are substitutable therein.

A dermatological and ophthalmic ointment has the following composition:

| | Pounds |
|---|---|
| Wool fat, USP | 100 |
| Mineral oil, USP | 125 |
| 6α-methyl-11β,17α-dihydroxy-1,4-pregnadiene-3,20-dione (micronized) | 7 |
| White petrolatum, USP | 500 |

Incorporation of an antibiotic in the ointment, especially neomycin sulfate, has therapeutic advantages each active ingredient potentiating and supplementing the useful properties of the other. Such an ointment is as follows:

| | Lbs. |
|---|---|
| Wool fat, USP | 100 |
| Mineral oil, USP | 125 |
| Neomycin sulfate | 3 |
| 6α-methyl-11β,17α-dihydroxy-1,4-pregnadiene-3,20-dione (micronized) | 3 |
| White petrolatum, USP | 500 |

In place of, or in addition to, neomycin sulfate, other antibiotics such as bacitracin, circulin, polymyxin B sulfate, gramicidin, streptomycin sulfate, dihydrostreptomycin sulfate, oxytetracycline, chlorotetracycline, tetracycline, chloramphenicol and the sulfonamides can be used in conjunction with the steroids of the present invention for preparations such as the above ointments.

The compounds of the instant invention, 6-methyl-11β,17α-dihydroxy-1,4-pregnadiene-3,20-dione and the 11-keto analogues thereof are also useful as starting materials for the preparation of other physiologically important compounds. For example, the 9α-halo analogues, especially 6α-methyl-9α-fluoro-11β,17α-dihydroxy-1,4-pregnadiene-3,20-dione and 6α-methyl-9α-fluoro-17α-hydroxy-1,4-pregnadiene-3,11,20-trione can be prepared as shown in Examples 11 and 12. The halo derivatives, 6α-methyl-9α-fluoro-11β,17α-dihydroxy-1,4-pregnadiene-3,20-dione and 6α-methyl-9α-fluoro-17α-hydroxy-1,4-pregnadiene-3,11,20-trione are compounds having glucocorticoid and anti-inflammatory activity and may be used instead of or with 6α-methyl-11β,17α-dihydroxy-1,4-pregnadiene-3,20-dione and 6α-methyl-17α-hydroxy-1,4-pregnadiene-3,11,20-trione in the above pharmaceutical compositions.

The starting compound of the instant invention are 1-dehydro-6-methylhydrocortisone (6α and 6β-epimers) or other 6-alkylhydrocortisones prepared as shown in Preparations 1 through 13.

In carrying out the process of the instant invention, 1-dehydro-6-methylhydrocortisone (6α-methyl-11β,17α,21-trihydroxy-1,4-pregnadiene-3,20-dione or 6β-methyl-11β,17α,21-trihydroxy-1,4-pregnadiene-3,20-dione) is treated with an acid halide of a sulfonic acid such as methanesulfonic acid, ethanesulfonic acid, propanesulfonic acid, benzenesulfonic acid, p-toluenesulfonic acid, α- or β-naphthanesulfonic acid, or the like, with methanesulfonic acid halides especially methanesulfonyl chloride preferred. The steroid is in the preferred embodiment of the instant invention reacted with the alkyl- or arylsulfonyl halide, in solution such as in a solvent, for example, pyridine, benzene, toluene, or the like, at a temperature between minus ten and plus thirty degrees centigrade, providing that at the lower temperature the reaction mixture has not solidified. Pyridine as solvent and a temperature between minus ten and plus ten degrees centigrade is preferred. The time of reaction is usually between thirty minutes and six or eight hours, after which the product, 6-methyl-11β,17α,21-trihydroxy-1,4-pregnadiene-3,20-dione 21-alkyl- or arylsulfonate is removed in conventional manner, for example, by evaporating the solvent until a dry residue is obtained or by extracting the material from an aqueous solution. For extraction, solvents such as methylene, chloride, chloroform, carbon tetrachloride, benzene, ether, toluene, or the like may be used. Removing the extraction solvent by distillation leaves the crude 6-methyl-11β,17α,21-trihydroxy-1,4-pregnadiene-3,20-dione 21-alkyl- or arylsulfonate.

For the purpose of producing the final product, it is unnecessary to purify the thus obtained 21-aryl- or 21-alkylsulfonate, and the crude steroid sulfonate ester is used for the production of 6-methyl-11β,17α-dihydroxy-21-iodo-1,4-pregnadiene-3,20-dione.

The 21-iodo compound is prepared by reacting the alkyl- or arylsulfonate of 11β,17α,21-trihydroxy-1,4-pregnadiene-3,20-dione with sodium or potassium iodide in acetone solution. A molar excess of sodium iodide (three to twenty moles of sodium iodide per mole of steroid) is generally preferred for this reaction and the reaction mixture containing 6-methyl-11β,17α,21-trihydroxy-1,4-pregnadiene-3,20-dione 21-alkyl- or arylsulfonate and sodium iodide in acetone is heated to reflux for a period of three or four minutes to half an hour. The thus produced 6-methyl-11β,17α-dihydroxy-21-iodo-1,4-pregnadiene-3,20-dione is isolated by evaporating the solvent. For the subsequent reaction it is unnecessary to purify the thus obtained 6-methyl-11β,17α-dihydroxy-21-iodo-1,4-pregnadiene-3,20-dione.

In order to obtain 6-methyl-11β,17α-dihydroxy-1,4-pregnadiene-3,20-dione, the crude 6-methyl-11β,17α-dihydroxy-21-iodo-1,4-pregnadiene-3,20-dione is reacted with a reducing agent such as sodium or potassium thiosulfate, sodium bisulfite, or the like. In the preferred embodiment of the invention, the crude 6-methyl-11β,17α-dihydroxy-21-iodo-1,4-pregnadiene-3,20-dione is slurried in acetic acid and thereto is added the aqueous solution of sodium or potassium thiosulfate, bisulfite, or the like and the mixture stirred at room temperature for a period of ten minutes to two hours. The product is isolated from the aqueous reaction mixture by conventional methods such as filtration or extraction with a water-immiscible organic solvent, such as ether, benzene, methylene chloride, ethylene chloride, carbon tetrachloride, chloroform, hexane, heptane, or the like, and evaporating the extracts. Purification of the thus obtained 6-methyl-11β,17α-dihydroxy-1,4-pregnadiene-3,20-dione is carried out by conventional means such as recrystallization from ether, acetone, methanol, ethanol, Skellysolve B hexane, mixtures thereof, or the like, or by chromatography.

The oxidation of 6-methyl-11β,17α-dihydroxy-1,4-pregnadiene-3,20-dione is generally carried out in conventional manner such as, for example, oxidizing the 6-methyl-11β,17α-dihydroxy-1,4-pregnadiene-3,20-dione in acetic acid solution with chromic anhydride using a calculated amount of cromic anhydride or a slight excess such as from ten to thirty percent excess above the calculated amount; or oxidizing the 11β,17α-dihydroxy-1,4-pregnadiene-3,20-dione with a haloamide or haloimide of an acid such as N-bromoacetamide, N-chlorosuccinimide, N-bromosuccinimide in pyridine, dioxane, or other solvent solutions. After termination of the oxidation, the oxidant is generally destroyed such as by addition of methyl alcohol, ethyl alcohol, when chromic acid was used or an alkali bisulfite when either chromic acid or N-bromosuccinimide and other N-haloacylamides were used. Thereafter, the product 6-methyl-17α-hydroxy-1,4-pregnadiene-3,11,20-trione is obtained by conventional means such as extraction with water-immiscible solvents, for example, methylene chloride, ethylene chloride, chloroform, carbon tetrachloride, ether, benzene, toluene, or the like, or by chromatography, if deemed necessary.

The following preparations and examples are illustrative of the process and products of the present invention, but are not to be construed as limiting.

PREPARATION 1

*5α,6α-oxido-11β,17α,21-trihydroxyallopregnane 3,20-dione 3,20-bis-(ethylene ketal)*

To a solution of 0.901 gram of 11β,17α,21-trihydroxy- 4-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, dried over anhydrous sodium sulfate and evaporated to dryness to give 1.031 grams of crude solid. Recrystallization from acetone gave 431 milligrams of material of melting point 230 to 247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, 25 and fifty percent acetone, acetone, and acetone plus five percent methanol. The acetone plus five percent methanol eluate gave an additional 279 milligrams of the high melting product. The high melting material, $5\alpha,6\alpha$ - oxido - $11\beta,17\alpha,21$-trihydroxyallopregnane-3,20-dione 3,20-bis - (ethylene ketal) was three times recrystallized from acetone and methanol to give a pure product of melting point 263 to 268 degrees centigrade. Other eluate fractions of lower melting point contained the $5\beta,6\beta$-isomer thereof.

PREPARATION 2

$5\alpha,6\alpha$-oxido-$17\alpha,21$-dihydroxypregnane-3,11,20-trione-3,20-bis-(1,2-propylene ketal)

To a solution of one gram of $17\alpha,21$-dihydroxy-5-pregnene-3,11,20-trione 3,20-bis-(1,2-propylene ketal) [cortisone 3,20-bis-(1,2-propylene ketal)] in chloroform was added a solution of perbenzoic acid in chloroform and the resulting solution allowed to stand in a refrigerator and then at room temperature, following the procedure of Preparation 1. The reaction solution was washed, dried, and evaporated as in Preparation 1. Recrystallization from acetone followed by fractionation of the mother liquor on a column of acid washed alumina, using the technique of Preparation 1, yielded $5\alpha$, $6\alpha$-oxido-$17\alpha,21$-dihydroxyallopregnane - 3,11,20-trione 3,20-bis-(1,2-propylene ketal) and the $5\beta,6\beta$-oxido isomer.

Using as starting material in Preparation 2 the more commonly available cortisone 3,20-bis-(ethylene ketal) gives the $5\alpha,6\alpha$ - oxido-$17\alpha,21$ - dihydroxyallopregnane-3,11,20-trione 3,20-bis-(ethylene ketal).

In the same manner as shown in Preparations 1 and 2, $5\alpha,6\alpha$-oxido - $11\beta,17\alpha$-21-trihydroxyallopregnane-3,20-dione 3,20-bis-(alkylene ketals) and $5\alpha,6\alpha$-oxido-$17\alpha,21$-dihydroxyallopregnane-3,11,20-trione 3,20 - bis-(alkylene ketals) can be prepared by reacting cortisone or hydrocortisone diketals, wherein the ketal group has been formed by reacting the steroid 3,20-dione with glycols, such as ethylene, propylene, 1,2-, 1,3-, or 2,3-butylene glycol or pentane, hexane, heptane, or octane-diols wherein the alcohol groups are in vicinal positions such as 1,2, 2,3, 3,4, or the like, or separated by one carbon atom such as 1,3, 2,4, 3,5, and the like with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with higher alkanediols.

PREPARATION 3

$5\alpha,11\beta,17\alpha,21$-tetrahydroxy-$6\beta$-methylallopregnane-3,20-dione 3,20-bis-(ethylene ketal)

A solution of 1.115 grams of $5\alpha,6\alpha$-oxido-$11\beta,17\alpha,21$-trihydroxyallopregnane-3,20-dione 3,20 - bis - (ethylene ketal) in 165 milliliters of tetrahydrofuran (the tetrahydrofuran being dried through distillation over lithium aluminum hydride) was added dropwise to a solution of 95 milliliters of methyl magnesium bromide in ether (the magnesium bromide having a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl acetate and the extracts added to the benzene layer. The combined benzene-ethyl acetate solution was thereupon washed with water, dried over anhydrous sodium sulfate and evaporated to dryness to give 1.314 grams of crude solid. Trituration of this material with ether left 1.064 grams of crystalline product of melting point 221 to 230 degrees. Recrystallization of this material gave $5\alpha,11\beta,17\alpha,21$-tetrahydroxy-$6\beta$-methylallopregnane-3,20-dione, 3,20 - bis - (ethylene ketal) of melting point 228 to 233 degrees and rotation $[\alpha]_D$ minus eleven degrees in chloroform.

Analysis.—Calcd. for $C_{26}H_{42}O_8$: C, 64.70; H, 8.77. Found: C, 64.29; H, 8.69.

PREPARATION 4

$5\alpha,11\beta,17\alpha,21$-tetrahydroxy - $6\beta$ - ethylallopregnane-3,20-dione 3,20-bis-(ethylene ketal)

In the same manner as shown in Preparation 4, $5\alpha,6\alpha$-oxido-$11\beta,17\alpha,21$-trihydroxyallopregnane-3,20-dione 3,20-bis-(ethylene ketal), was reacted with ethyl magnesium bromide in ether solution to give the corresponding $5\alpha,11\beta,17\alpha,21$-tetrahydroxy - $6\beta$ - ethylallopregnane-3,20-dione 3,20-bis-(ethylene ketal).

In the same manner as shown in Preparations 3 and 4, other $5\alpha,11\beta,17\alpha,21$ - tetrahydroxy-$6\beta$-alkylallopregnane-3,20-dione 3,20-bis-(ethylene ketals) and $5\alpha,17\alpha,21$-trihydroxy - $6\beta$ - alkylallopregnane-3,11,20-trione 3,20-bis-(ethylene ketals) are prepared by reacting the corresponding $5\alpha,6\alpha$-oxido-$17\alpha,21$-dihydroxyallopregnane-3,20-dione 3,20-bis-(ethylene ketal) oxygenated in the 11-position with a metal alkyl or metal aryl more specifically an alkyl metal halide such as a Grignard reagent, for example, methyl, ethyl, propyl, isopropyl, butyl, pentyl, hexyl, and phenyl magnesium bromides and iodides or cadmium alkyl and calcium alkyl and phenyl bromides or iodides. Representative $6\beta$-alkylated allopregnanes thus prepared include: $5\alpha,11\beta,17\alpha,21$ - tetrahydroxy-$6\beta$-propylallopregnane-3,20-dione 3,20-bis-(ethylene ketal), $5\alpha,11\beta,17\alpha,21$-tetrahydroxy - $6\beta$ - butylallopregnane-3,20-dione 3,20-bis-(ethylene ketal), $5\alpha,11\beta,17\alpha,21$-tetrahydroxy-$6\beta$-isobutylallopregnane-3,20-dione 3,20-bis-(ethylene ketal), $5\alpha11\beta,17\alpha,21$-tetrahydroxy-$6\beta$-pentylallopregnane-3,20-dione 3,20-bis-(ethylene ketal), $5\alpha,11\beta,17\alpha,21$-tetrahydroxy-$6\beta$-hexylallopregnane-3,20-dione 3,20-bis-(ethylene ketal), $5\alpha,11\beta,17\alpha,21$-tetrahydroxy-$6\beta$-phenylallopregnane - 3,20-dione 3,20-bis-(ethylene ketal); $5\alpha,17\alpha,21$-trihydroxy-$6\beta$-methylallopregnane-3,11,20-trione 3,20-bis-(ethylene ketal), $5\alpha,17\alpha,21$-trihydroxy-$6\beta$-ethylallopregnane-3,11,20-trione 3,20-bis-(ethylene ketal), $5\alpha,17\alpha,21$-trihydroxy-$6\beta$-propylallopregnane-3,11,20-trione 3,20-bis-(ethylene ketal), $5\alpha,17\alpha,21$-trihydroxy-$6\beta$-isopropylallopregnane-3,11,20-trione 3,20-bis-(ethylene ketal), $5\alpha,17\alpha,21$-trihydroxy-$6\beta$-butylallopregnane-3,11,20-trione 3,20-bis-(ethylene ketal), $5\alpha,17\alpha,21$-trihydroxy-$6\beta$-pentylallopregnane-3,11,20-trione 3,20-bis-(ethylene ketal), $5\alpha,17\alpha,21$-trihydroxy-$6\beta$-hexylallopregnane-3,11,20-trione 3,20 - bis - (ethylene ketal), $5\alpha,17\alpha,21$-trihydroxy-$6\beta$-phenylallopregnane-3,11,20-trione 3,20-bis-(ethylene ketal), and the like.

PREPARATION 5

$5\alpha,11\beta,17\alpha,21$-tetrahydroxy-$6\beta$-methylallopregnane-3,20-dione A solution was prepared containing 468 milligrams of $5\alpha,11\beta,17\alpha,21$ - tetrahydroxy-$6\beta$-methylallopregnane-3,20-dione 3,20-bis-(ethylene ketal), 38 milliliters of methanol and 7.7 milliliters of 2 N sulfuric acid. This solution was refluxed for a period of thirty minutes, then neutralized with five percent dilute sodium bicarbonate solution (about 100 milliliters) and concentrated under reduced pressure at 55 degrees centigrade to about 35 milliliters of volume. A product crystallized upon cooling and was recovered by filtration. This product was recrystallized from acetone Skellysolve B hexanes to give an analytically pure sample of $5\alpha,11\beta,17\alpha,21$-tetrahydroxy-$6\beta$-methylallopregnane-3,20-dione of melting point 240 to 244 (decomposition) and rotation $[\alpha]_D$ plus forty degrees in dioxane.

*Analysis.*—Calcd. for $C_{22}H_{34}O_6$: C, 66.98; H, 8.69. Found: C, 66.84; H, 8.86.

PREPARATION 6

$5\alpha,11\beta,17\alpha,21$-tetrahydroxy-$6\beta$-ethylallopregnane-3,20-dione In the same manner as shown in Example 5, $5\alpha,11\beta,17\alpha,21$-tetrahydroxy-$6\beta$-ethylallopregnane-3,20-dione 3,20-bis-(ethylene ketal) was hydrolyzed with dilute sulfuric acid in ethanol solution to give $5\alpha,11\beta,17\alpha,21$-tetrahydroxy-$6\beta$-ethylallopregnane-3,20-dione.

In the same manner as shown in Preparations 5 and 6, inclusive, hydrolysis of the $6\beta$-alkylallopregnane diketals, such as the $5\alpha,11\beta,17\alpha,21$-tetrahydroxy-$6\beta$-alkylallopregnane-3,20-dione 3,20-bis-(ethylene ketal), and $5\alpha,17\alpha,21$-trihydroxy-$6\beta$-alkylallopregnane-3,11,20-trione, 3,20-bis-(ethylene ketal) as well as those $6\beta$-alkylallopregnane-3,20-dione 3,20-bis-(ketals) wherein the ketal group is other than ethylene, e. g., propylene gives the corresponding $5\alpha,17\alpha,21$-trihydroxy-$6\beta$-alkylallopregnane-3,20 dione oxygenated in the 11-position, such as for example, $5\alpha,11\beta,17\alpha,21$-tetrahydroxy-$6\beta$-propylallopregnane-3,20-dione, $5\alpha,11\beta,17\alpha,21$-tetrahydroxy-$6\beta$-butylallopregnane-3,20-dione, $5\alpha,11\beta,17\alpha,21$-tetrahydroxy-$6\beta$-isobutylallopregnane-3,20-dione, $5\alpha,11\beta,17\alpha,21$-tetrahydroxy-$6\beta$-pentylallopregnane-3,20-dione, $5\alpha,11\beta,17\alpha,21$-tetrahydroxy-$6\beta$-hexylallopregnane-3,20-dione, $5\alpha,11\beta,17\alpha,21$-tetrahydroxy-$6\beta$-phenylallopregnane-3,20-dione, $5\alpha,17\alpha,21$-trihydroxy-$6\beta$-methylallopregnane-3,11,20-trione, $5\alpha,17\alpha,21$-trihydroxy-$6\beta$-ethylallopregnane-3,11,20-trione, $5\alpha,17\alpha,21$-trihydroxy-$6\beta$-propylallopregnane-3,11,20-trione, $5\alpha,17\alpha,21$-trihydroxy-$6\beta$-isopropylallopregnane-3,11,20-trione, $5\alpha,17\alpha,21$-trihydroxy-$6\beta$-butylallopregnane-3,11,20-trione, $5\alpha,17\alpha,21$-trihydroxy-$6\beta$-hexylallopregnane-3,11,20-trione, $5\alpha,17\alpha,21$-trihydroxy-$6\beta$-pentylallopregnane-3,11,20-trione, $5\alpha,17\alpha,21$-trihydroxy-$6\beta$-phenylallopregnane-3,11,20-trione, and the like, and including those $6\beta$-alkylallopregnanes having ketal groups in positions 3 and 20 such as exemplified in Preparation 2.

PREPARATION 7

$6\alpha$-methylhydrocortisone

A stream of nitrogen was bubbled through a solution of 429 milligrams of $5\alpha,11\beta,17\alpha,21$-tetrahydroxy-$6\beta$-methylallopregnane-3,20-dione contained in 100 milliliters of denatured absolute alcohol for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and thereupon acidified with acetic acid, and concentrated under reduced pressure at 55 degrees centigrade to dryness. The residue weighing 417 milligrams was recrystallized from acetone-Skellysolve B hexanes to give in two crops 249 milligrams of $6\alpha$-methylhydrocortisone melting between 184 and 194 degrees centigrade. An analytical sample was prepared melting at 203 to 208 degrees centigrade and consisting of pure $6\alpha$-methylhydrocortisone.

*Analysis.*—Calcd. for $C_{22}H_{32}O_5$: C, 70.18; H, 8.57. Found: C, 70.32; H, 8.50.

The mother liquors contained besides $6\alpha$-methylhydrocortisone, substantial amounts of $6\beta$-methylhydrocortisone which can be isolated by recrystallization, papergram, countercurrent procedures and other means known in the art.

PREPARATION 8

$6\beta$-methylhydrocortisone

A solution was prepared containing 27.5 grams of $5\alpha,11\beta,17\alpha,21$-tetrahydroxy-$6\beta$-methylallopregnane-3,20-dione in 6500 milliliters of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 milliliters). The solution was allowed to stand at room temperature (about 22 to 24 degrees centrigrade) in an inert nitrogen atmosphere for a period of twenty hours and was then acidified with fourteen milliliters of acetic acid. The thus obtained acid solution was evaporated at about fifty to sixty degrees centigrade in vacuo, the thus produced residue dissolved in 200 milliliters of ethyl acetate and 200 milliliters of water, the water layer separated from the organic layer and discarded, the organic layer washed with 350 milliliters of five percent aqueous sodium bicarbonate solution, then three times with water and thereupon dried over anhydrous sodium sulfate and concentrated to a volume of 180 milliliters. After cooling the 180 milliliters of solution in a refrigerator (about five degrees centigrade), the solution was filtered giving 11.9 grams of material. This material was redissolved in 500 milliliters of ethyl acetate, the ethyl acetate solution was concentrated to 150 milliliters, refrigerated as before to give 6.15 grams of crude $6\beta$-methylhydrocortisone of melting point 220–223.

Recrystallization of the crude $6\beta$-methylhydrocortisone three more times from ethyl acetate gave an analytical sample of $6\beta$-methylhydrocortisone with melting point 223 to 227 degrees centigrade, rotation $[\alpha]_D$ plus 105 degrees in acetone;

ultraviolet absorbtion $\lambda_{max.}^{95\% \text{ ethanol}}$ 243 m$\mu$ $a_M = 14{,}500$.

*Analysis.*—Calcd. for $C_{22}H_{32}O_5$: C, 70.17; H, 8.57. Found: C, 70.54; H, 8.91.

PREPARATION 9

$6\alpha$-ethylhydrocortisone

In the same manner as shown in Preparation 7, $5\alpha,11\beta,17\alpha,21$-tetrahydroxy-$6\beta$-ethylallopregnane-3,20-dione was treated with a solution of potassium hydroxide in methanol to give at room temperature, $6\alpha$-ethylhydrocortisone of melting point 223–226 degrees centigrade and $\lambda_{max.}^{EtOH}$ 243

$\epsilon = 14{,}525$.

In the same manner dehydrating with an alkali metal hydroxide in alcoholic solution other 11-oxygenated-$5\alpha,17\alpha,21$-trihydroxy-$6\beta$-alkylallopregnane-3,20-diones produced the corresponding 11-oxygenated 6-alkyl-$17\alpha,21$-dihydroxy-6-alkyl-4-pregnene-3,20-diones ($\alpha$ or $\beta$-epimers) such as 6-propylhydrocortisone, 6-butylhydrocortisone, 6-isobutylhydrocortisone, 6-pentylhydrocortisone, 6-hexylhydrocortisone, 6-phenylhydrocortisone, $6\alpha$-methylcortisone of melting point 212.5 to 215 degrees centigrade, 6-ethylcortisone, 6-propylcortisone, 6-isopropylcortisone, 6-butylcortisone, 6-pentylcortisone, 6-hexylcortisone, 6-phenylcortisone, and the like.

PREPARATION 10

1-dehydro-$6\alpha$-methylhydrocortisone (6-methyl-$11\beta,17\alpha,21$-trihydroxy-1,4-pregnadiene-3,20-dione Six 100-milliliter portions of a medium in 250-milliliter Erlenmeyer flasks containing one percent glucose, two percent corn steep liquor (60 percent solids) and tap water was adjusted to a pH of 5.9. This medium was sterilized for 45 minutes at fifteen pounds per square inch pressure and inoculated with a one to two day growth of Septomyxa affinis ATCC 6737. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 R. P. M.) and aerated (0.5 l. air/10 l. beer). After 17 hours of incubation, when a good growth developed and the acidity rose to pH 6.7, two grams of 6α-methylhydrocortisone plus one gram of 3-ketobisnor-4-cholen-22-al, dissolved in 115 milliliters of dimethylformamide, was added and the incubation (conversion) carried out at the same temperature and aeration for 24 hours (final pH 7.9). The mycelium (56 grams dry weight) was filtered off and the steroidal material was extracted with methylene chloride, the methylene chloride extracts evaporated to dryness, and the resulting residue chromatographed over a Florisil column. The column was packed with 200 grams of Florisil and was developed with five 400-milliliter fractions each of methylene chloride, Skellysolve B-hexane-acetone mixtures of 9:1, 8:2, 7:3, 1:1, and methanol. The fraction eluted with Skellysolve B-acetone (7:3) weighed 1.545 grams and on recrystallization from acetone gave, in three crops, 928 milligrams of product of melting point 210–235 degrees. The sample of 1-dehydro-6α-methylhydrocortisone prepared for analysis melted at 245 to 247 degrees. Rotation $[\alpha]_D$ was plus 83 degrees, in dioxane.

Analysis.—Calcd. for $C_{22}H_{30}O_5$: C, 70.56; H, 8.08. Found: C, 70.53; H, 7.94.

$$\lambda_{max.}^{EtOH}\ 243,\ \epsilon = 14,875$$

Infrared absorption in Nujol mineral oil suspension:

| | | | |
|---|---|---|---|
| OH | 3,430 | 3,330 | 3,180 cm.⁻¹ |
| 20-keto | 1,706 | | |
| conjugated | | | |
| 3-keto | 1,645 | | |
| $\Delta^{1,4}$-double bond | 1,592 | | |

PREPARATION 11

*1-dehydro-6α-methylcortisone*

In the same manner given in Preparation 9, 6α-methylcortisone was submitted to fermentation by Septomyxa affinis in the same nutrient medium with crude 11β,21-dihydroxy-4,17(20)-pregnadien-3-one as promoter to give 1-dehydro-6α-methylcortisone of melting point 230 to 232 degrees centigrade.

Instead of the 3-ketobisnor-4-cholen-22-al as promoter progesterone, crude 11β,21-dihydroxy-4,17(20)-pregnadien-3-one or 3-ketobisnor-4-cholenic acid may be used.

PREPARATION 12

*1-dehydro-6β-methylhydrocortisone*

In the same manner given in Preparation 9, fermenting with Septomyxa affinis in a nutrient medium with crude 11β,21 - dihydroxy - 4,17(20)-pregnadien-3-one as promoter 6β-methylhydrocortisone yielded 1-dehydro-6β-methylhydrocortisone.

PREPARATION 13

In the manner shown in Preparation 9, by fermentation with microorganisms of the genera Corynebacterium, Didymella, Calonectria, Alternaria, Colletotrichum, Cylindrocarpon, Ophiobolus, Septomyxa, Fusarium, Listeria or Erysipelothrix:

(a) 6-ethylhydrocortisone (6α or 6β-epimers) yielded the corresponding 1-dehydro-6-ethylhydrocortisone.

(b) 6-propylhydrocortisone yielded 1-dehydro-6-propylhydrocortisone.

(c) 6-butylhydrocortisone yielded 1-dehydro-6-butylhydrocortisone.

(d) 6-hexylhydrocortisone yielded 1-dehydro-6-hexylhydrocortisone.

(e) 6-phenylhydrocortisone yielded 1-dehydro-6-phenylhydrocortisone.

(f) 6-ethylcortisone yielded 1-dehydro-6-ethylcortisone.

(g) 6-propylcortisone yielded 1-dehydro-6-propylcortisone.

(h) 6-butylcortisone yielded 1-dehydro-6-butylcortisone.

(i) 6-phenylcortisone yielded 1-dehydro-6-phenylcortisone.

In the same manner as shown in Preparations 11 and 12, other 1-dehydro-6-alkyl and 1-dehydro-6-arylhydrocortisones and cortisones are produced by subjecting the corresponding 6-alkylated or 6-arylated cortisone (6α and 6β-epimers) or, respectively, hydrocortisone compounds (6α- or 6β-epimers) or the esters thereof to fermentation especially by Corynebacterium simplex or Septomyxa affinis in the absence or presence of steroidal promoters such as 3-ketobisnor-4-cholen-22-al, 3-ketobisnor-4-cholenic acid and progesterone. Representative 1-dehydro-6-alkyl and 1-dehydro-6-aryl-11-oxygenated-17α, 21-dihydroxy-1,4-pregnadiene-3,20-diones, thus produced, include: 1-dehydro-6-pentylhydrocortisone, 1-dehydro-6-hexylhydrocortisone, 1-dehydro-6-isopropylcortisone, 1-dehydro-6-isobutylhydrocortisone, 1-dehydro-6-butylcortisone, 1-dehydro-6-hexylcortisone, 1-dehydro-6-isopropylhydrocortisone, 1-dehydro-6-isopentylcortisone, 1-dehydro-6-isobutylcortisone, and the like.

EXAMPLE 1

*6α-methyl-11β,17α,21-trihydroxy-4-pregnene-3,20 - dione 21 - methanesulfonate (6α - methylhydrocortisone 21-methanesulfonate)*

A solution was prepared containing 164 milligrams (0.437 millimole) of 1-dehydro-6α-methylhydrocortisone in one milliliter of pyridine. This solution was cooled to zero degrees centigrade and treated with a cooled solution of 75 milligrams of methanesulfonyl chloride in 0.5 milliliter of pyridine. Thereafter the solution was allowed to stand at a temperature between zero and five degrees centigrade for a period of two hours. Thereafter ice and sufficient dilute hydrochloric acid to neutralize the pyridine was added and the mixture extracted with three 25-milliliter portions of methylene chloride. The extracts were combined, washed with cold sodium bicarbonate solution, then water and finally dried over anhydrous sodium sulfate and evaporated at reduced pressure to give crystalline 6α-methyl-11β,17α,21-trihydroxy-1,4-pregnadiene-3,20-dione 21-methanesulfonate.

EXAMPLE 2

*6α-methyl-11β,17α-dihydroxy-21-iodo-1,4-pregnadiene-3,20-dione*

The crystalline methanesulfonate of 6α-methyl-11β,17α, 21-trihydroxy-1,4-pregnadiene-3,20-dione of Example 1 was dissolved in fifteen milliliters of acetone and treated with a solution of 200 milligrams of sodium iodide in five milliliters of acetone. The mixture was heated under reflux with stirring for a period of fifteen minutes. The heating was then discontinued and the mixture concentrated to dryness at reduced pressure to give 6α-methyl-11β,17α-dihydroxy-21-iodo-1,4-pregnadiene-3,20-dione.

EXAMPLE 3

*6α-methyl-11β,17α-dihydroxy-1,4-pregnadiene-3,20-dione*

The crude 6α-methyl-11β,17α-dihydroxy-21-iodo-1,4- pregnadiene-3,20-dione was slurried with five milliliters of acetic acid and stirred for a period of 45 minutes. Thereafter was added an aqueous solution of 250 milligrams of sodium thiosulfate pentahydrate causing the iodine color to disappear. Additional water was added (fifty milliliters) and the mixture extracted with three 25-milliliter portions of methylene chloride. The methylene chloride extracts were combined, washed with water and cold sodium bicarbonate solution until all acetic acid was neutralized. After drying over anhydrous sodium sulfate, the solution was concentrated to approximately fifteen milliliters and chromatographed over ten grams of Florisil synthetic magnesium silicate taking fractions of fifty milliliters each as follows: nine fractions of acetone-Skellysolve B hexanes containing ten percent acetone, four fractions of acetone Skellysolve B-hexanes containing fifteen percent acetone and one fraction of 100 percent acetone.

Fractions six through eleven, inclusive, were combined and evaporated to give 136 milligrams of crystals which after recrystallization from acetone-Skellysolve B hexanes yielded 115 milligrams (72 percent overall yield) of 6α-methyl-11β,17α-dihydroxy-1,4-pregnadiene-3,20-dione of melting point 222 to 231 degrees centigrade.

*Analysis.*—Calc'd. for $C_{22}H_{30}O_4$: C, 73.7; H, 8.44. Found: C, 73.30; H, 8.44.

EXAMPLE 4

*6α-methyl-17α-hydroxyl-1,4-pregnadiene-3,11,20-trione*

A mixture was prepared containing 0.3 gram of 6α-methyl-11β,17α-dihydroxy-1,4-pregnadiene - 3,20 - dione, 100 milligrams of chromic anhydride, ten milliliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus obtained precipitate collected on a filter and three times recrystallized from ethyl acetate and Skellysolve B hexanes to give 6α-methyl-17α-hydroxy-1,4-pregnadiene-3,11,20 - trione.

EXAMPLE 5

*6α-ethyl-11β,17α,21-trihydroxy-1,4-pregnadiene-3,20-dione 21-toluenesulfonate*

In the same manner given in Example 1, 1-dehydro-6α-ethylhydrocortisone, dissolved in pyridine, was treated with toluenesulfonyl chloride to give 6α-ethyl-11β,17α,21-trihydroxy-1,4-pregnadiene-3,20-dione 21 - toluenesulfonate.

EXAMPLE 6

*6α-ethyl-11β,17α-dihydroxy-21-iodo-1,4-pregnadiene-3,20-dione*

In the same manner given in Example 2, refluxing 6α-ethyl-11β,17α,21-trihydroxy-1,4-pregnadiene-3,20 - dione 21-toluenesulfonate with sodium iodide in acetone yielded 6α-ethyl-11β,17α-dihydroxy-21 - iodo - 1,4 - pregnadiene-3,20-dione.

EXAMPLE 7

*6α-ethyl-11β,17α-dihydroxy-1,4-pregnadiene-3,20-dione*

To a solution of 6α-ethyl-11β,17α-dihydroxy-21-iodo-1,4-pregnadiene-3,20-dione in fifty percent aqueous acetic acid was added an excess of sodium bisulfite and the mixture was stirred for an hour at room temperature. Thereafter the mixture was poured into excess of water and extracted with methylene chloride. The methylene chloride extracts were combined, washed with water, sodium bicarbonate solution, then water again, dried over anhydrous sodium sulfate and evaporated to give crude 6α-ethyl-11β,17α-dihydroxy - 1,4 - pregnadiene - 3,20 - dione which was purified by recrystallization from acetone-Skellysolve B hexanes to give the pure 6α-ethyl-11β,17α-dihydroxy-1,4-pregnadiene-3,20-dione.

EXAMPLE 8

*6α-ethyl-17α-hydroxy-1,4-pregnadiene-3,11,20-trione*

To 200 milligrams of 6α-ethyl-11β,17α-dihydroxy-1,4-pregnadiene-3,20-dione in eight milliliters of methanol was added 0.2 milliliter of pyridine, 0.4 milliliter of water and 150 milligrams of N-bromoacetamide. The reaction mixture was kept at room temperature for a period of twenty hours and then 25 milliliters of dilute sodium sulfite solution was added to destroy excess N-bromoacetamide. The mixture was thereupon concentrated until copious crystallization occurred. The mixture was then cooled to zero degrees centigrade and kept at this temperature for a period of one hour, filtered, and the thus obtained crystalline precipitate recrystallized from acetone-Skellysolve B hexane solution to yield pure 6α-ethyl-17α-hydroxy-1,4-pregnadiene-3,11,20-trione.

EXAMPLE 9

*6α-methyl-17α-hydroxy-1,4-pregnadiene-3,11,20-trione*

In the same manner shown in Example 1, treating 1-dehydro-6α-methylcortisone with methanesulfonyl chloride in pyridine solution yielded 6α-methyl-17α,21-dihydroxy-1,4-pregnadiene-3,11,20-trione 21-methanesulfonate; refluxing in the manner given in Example 2, 6α-methyl-17α,21-dihydroxy-1,4-pregnadiene-3,11,20 - trione 21-methanesulfonate with potassium iodide in acetone yielded 6α-methyl-17α-hydroxy-21-iodo-1,4-pregnadiene-3,11,20-trione and reducing with sodium thiosulfate the 6α-methyl-17a-hydroxy-21-iodo - 1,4 - pregnadiene - 3,11,20-trione as shown in Example 3 yielded 6α-methyl-17α-hydroxy-1,4-pregnadiene-3,11,20-trione.

EXAMPLE 10

In the same manner shown in Example 1, treating other 1-dehydro-6α-alkylhydrocortisones and 1-dehydro-6α-alkyl-cortisones with the chlorides or bromides of toluenesulfonic acid, methanesulfonic acid and other organic sulfonic acids, give the corresponding 21-toluenesulfonate, the 21-methanesulfonate, or the like, of the corresponding 1-dehydro-6α-alkylhydrocortisone and 1-dehydro-6α-alkylcortisone wherein the alkyl group is methyl, ethyl, propyl, isopropyl, butyl, isobutyl, pentyl, hexyl, phenyl, or the like.

Treating the thus obtained 21-toluenesulfonate, 21-methanesulfonate or other 21-alkyl or 21-arylsulfonates of 1-dehydro-6α-alkylhydrocortisone and 1-dehydro-6α-alkylcortisone or the 1-dehydro-6α-aryl analogues thereof with sodium or potassium iodide in acetone at elevated temperature, usually reflux temperature, yields the corresponding 21-iodo compound such as, for example, 6α-propyl-11β,17α-dihydroxy-21-iodo-1,4-pregnadiene - 3,20-dione, 6α-isopropyl-11β,17α-dihydroxy-21-iodo-1,4-pregnadiene-3,20-dione, 6α-butyl-11β,17α-dihydroxy-21-iodo-1,4-pregnadiene-3,20-dione, 6α - isobutyl - 11β,17α - dihydroxy-21-iodo-1,4-pregnadiene-3,20-dione, 6α-pentyl-11β,17α-dihydroxy-21-iodo-1,4-pregnadiene - 3,20 - dione, 6α-phenyl-11β,17α-dihydroxy-21-iodo-1,4-pregnadiene - 3,20-dione, 6α-methyl-7α-hydroxy-21-iodo-1,4-pregnadiene-3,11,20-trione, 6α-ethyl-17α-hydroxy-21-iodo - 1,4 - pregnadiene,3,11,20-trione, 6α-propyl-17α-hydroxy-21-iodo-1,4-pregnadiene-3,11,20-trione, 6α-isopropyl-17α-hydroxy-21-iodo-1,4-pregnadiene-3,11,20-trione, 6α - butyl - 17α - hydroxy-21-iodo-1,4-pregnadiene-3,11,20-trione, 6α - isobutyl-17α-hydroxy-21-iodo-1,4-pregnadiene-3,11,20 - trione, 6α-pentyl-17α-hydroxy-21-iodo-1,4-pregnadiene - 3,11,20-trione, 6α-hexyl-17α-hydroxy-21-iodo-1,4-pregnadiene-3,11,20-trione, 6α-phenyl-17α-hydroxy-21-iodo-1,4-pregnadiene-3,11,20-trione, and the like.

Treating the thus obtained 6α-alkyl-11β,17α-dihydroxy-21-iodo-1,4-pregnadiene-3,20-diones and 6α-alkyl-17α-hydroxy-21-iodo-1,4-pregnadiene-3,11,20-triones with a reducing agent, such as zinc in acetic acid, sodium bisulfite, sodium or potassium thiosulfate produces the corresponding 6α-alkyl-11β,17α-dihydroxy-1,4-pregnadiene - 3, 20-diones and 6α-alkyl-17α-hydroxy-1,4-pregnadiene-3,11,20-triones wherein the alkyl group is ethyl, propyl, isopropyl, butyl, isobutyl, pentyl, hexyl, or aryl such as phenyl, or the like.

Instead of the 1-dehydro-6α-methylhydrocortisone or cortisone, the 6β-epimer can be used in the above examples and if the reaction conditions are kept near neutral, the 6β-epimers, such as 6β-methyl-11β,17α-dihydroxy-1,4-pregnadiene-3,20-dione and 6β-methyl-17α-hydroxy-1,4-pregnadiene-3,11,20-trione can be isolated from the reaction mixture. The thus obtained 6β-epimers yield the 6α-epimers by treatment of the 6β-epimer with acid or base in an organic solvent, e. g., ethanol at room temperature.

EXAMPLE 11

*6α-methyl-9α-fluoro-11β,17α-dihydroxy-1,4-pregnadiene-3,20-dione*

A mixture of one gram of 6α-methyl-11β,17α-dihydroxy-1,4-pregnadiene-3,20-dione, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.75 gram of 6α-methyl-17α-hydroxy-1,4,9(11)-pregnatriene-3,20-dione.

0.5 gram of 6α-methyl-17α-hydroxy-1,4,9(11)-pregnatriene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water and then dried and recrystallized from a mixture of acetone and Skellysolve B hexane hydrocarbons to give 6α-methyl-9α-bromo-11β,17α-dihydroxy-1,4-pregnadiene-3,20-dione.

A mixture of 0.45 gram of 6α-methyl-9α-bromo-11β,17α-dihydroxy-1,4-pregnadiene-3,20-dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 6α-methyl-9(11)-oxido-17α-hydroxy-1,4-pregnadiene-3,20-dione.

A solution of one gram of 6α-methyl-9(11)-oxido-17α-hydroxy-1,4-pregnadiene-3,20-dione was dissolved in fifty milliliters of methylene chloride and thereto was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried with anhydrous sodium sulfate and then poured over a column of 100 grams of Florisil synthetic magnesium silicate. The column was developed with Skellysolve B hexanes and acetone, the fractions containing ten percent acetone were recrystallized from acetone and Skellysolve B hexanes to give pure 6α-methyl-9α-fluoro-11β,17α-dihydroxy-1,4-pregnadiene-3,20-dione.

Following the procedure described in Example 11, but substituting other 6α-alkyl-11β,17α-dihydroxy-1,4-pregnadiene-3,20-diones for the 6α-methyl-11β,17α-dihydroxy-1,4-pregnadiene-3,20-dione wherein the alkyl radical is ethyl, propyl, isopropyl, butyl, isobutyl, pentyl, hexyl, or an aryl, such as phenyl, or the like, results in the corresponding 6α-alkyl-9α-fluoro-11β,17α-dihydroxy-1,4-pregnadiene-3,20-dione wherein the alkyl group will be ethyl, propyl, isopropyl, butyl, isobutyl, pentyl, hexyl; or an aryl such as phenyl, or the like.

EXAMPLE 12

*6α-methyl-9α-fluoro-17α-hydroxy-1,4-pregnadiene-3,11,20-trione*

Oxidizing in the manner given in Example 8, 6α-methyl-9α-fluoro-11β,17α-dihydroxy-1,4-pregnadiene-3,20-dione with N-bromoacetamide in pyridine solution produces 6α-methyl-9α-fluoro-17α-hydroxy-1,4-pregnadiene-3,11,20-trione.

In the same manner given in Example 12, oxidizing with N-bromoacetamide in pyridine solution or according to Example 4 with chromic anhydride in acetic acid solution, other 6α-alkyl- or 6α-aryl-9α-fluoro-11β,17α-dihydroxy-1,4-pregnadiene-3,20-dione results in the corresponding 6α-alkyl-9α-fluoro-17α-hydroxy-1,4-pregnadiene-3,11,20-triones wherein the alkyl group is ethyl, propyl, isopropyl, butyl, isobutyl, pentyl, hexyl, or aryl such as phenyl, or the like.

In the same manner as shown with the 6α-epimers the 6β-epimers may be used as starting materials for the above Examples 11 and 12.

The present application is a continuation-in-part of application Serial No. 608,662, filed September 10, 1956, and now abandoned.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:
1. A compound selected from the group consisting of 6 - methyl - 11β,17α - dihydroxy - 1,4 - pregnadiene-3,20-dione and 6-methyl-17α-hydroxy-1,4-pregnadiene-3,11,20-trione.
2. 6 - methyl - 11β,17α - dihydroxy - 1,4 - pregnadiene-3,20-dione.
3. 6α - methyl - 11β,17α - dihydroxy - 1,4 - pregnadiene-3,20-dione.
4. 6 - methyl - 17α - hydroxy - 1,4 - pregnadiene-3,11-20-trione.
5. 6α - methyl - 17α - hydroxy - 1,4 - pregnadiene-3,11,20-trione.

References Cited in the file of this patent

UNITED STATES PATENTS

| | | |
|---|---|---|
| 2,684,968 | Bergstrom | July 27, 1954 |
| 2,752,369 | Holysz et al. | June 26, 1956 |
| 2,756,179 | Fried | July 24, 1956 |
| 2,767,199 | Djerassi | Oct. 16, 1956 |
| 2,768,189 | Nomine | Oct. 23, 1956 |

OTHER REFERENCES

Fieser and Fieser: Natural Products Related to Phenanthrene, third ed., 1949, page 438, Reinhold Publishing Corp., New York.

Tannhauser et al.: JACS, vol. 78, pages 2658–9, June 5, 1956.

UNITED STATES PATENT OFFICE
Certificate of Correction

Patent No. 2,867,632                                                        January 6, 1959

Frank H. Lincoln, Jr. et al.

It is hereby certified that error appears in the printed specification of the above numbered patent requiring correction and that the said Letters Patent should read as corrected below.

Column 2, line 30, for "subjects" read —objects—; column 4, line 51, for "cromic" read —chromic—; column 10, line 75, for "-1$\beta$,17$\alpha$-" read —-11$\beta$,17$\alpha$-—; column 11, line 24, for "C, 73.7" read —C, 73.71—; line 28, Example 4, in the heading thereof, for "-hydroxyl-" read —-hydroxy-—; column 12, line 59, for "-7$\alpha$-hydroxy-" read —17$\alpha$-hydroxy-—.

Signed and sealed this 7th day of July 1959.

[SEAL]

Attest:
KARL H. AXLINE,
*Attesting Officer.*

ROBERT C. WATSON,
*Commissioner of Patents.*